(12) United States Patent
Vandenplas et al.

(10) Patent No.: US 9,995,410 B2
(45) Date of Patent: Jun. 12, 2018

(54) AEROSPACE ELECTROVALVE FOR HIGH-PRESSURE CRYOGENIC GAS

(71) Applicant: Techspace Aero S.A., Herstal (Milmort) (BE)

(72) Inventors: Xavier Vandenplas, Liege (BE); Cédric Frippiat, Jehanster (BE)

(73) Assignee: SAFRAN AERO BOOSTERS SA, Herstal (Milmort) (BE)

( * ) Notice: Subject to any disclaimer, the term of this patent is extended or adjusted under 35 U.S.C. 154(b) by 412 days.

(21) Appl. No.: 14/664,179

(22) Filed: Mar. 20, 2015

(65) Prior Publication Data
US 2015/0267837 A1 Sep. 24, 2015

(30) Foreign Application Priority Data
Mar. 21, 2014 (EP) .................................... 14161166

(51) Int. Cl.
*F16K 31/06* (2006.01)
*F16K 39/02* (2006.01)
*F16K 31/40* (2006.01)

(52) U.S. Cl.
CPC ........ *F16K 31/0655* (2013.01); *F16K 31/408* (2013.01); *F16K 39/024* (2013.01)

(58) Field of Classification Search
CPC ... F26K 31/0655; F26K 31/408; F26K 39/024
USPC ....................................................... 251/30.01
See application file for complete search history.

(56) References Cited

U.S. PATENT DOCUMENTS

| | | | | |
|---|---|---|---|---|
| 3,888,280 A | * | 6/1975 | Tartaglia | F16K 39/024 137/630.13 |
| 4,699,351 A | * | 10/1987 | Wells | F16K 31/408 251/29 |
| 4,746,093 A | * | 5/1988 | Scanderbeg | F15B 13/015 251/282 |
| 4,928,733 A | | 5/1990 | Sudolnik et al. | |

(Continued)

FOREIGN PATENT DOCUMENTS

GB    1196505 A  *  6/1970
WO   2008050227 A2    5/2008

OTHER PUBLICATIONS

Search Report dated Oct. 6, 2014 from European Patent Appl. No. 14161166.5.

*Primary Examiner* — Jessica Cahill
*Assistant Examiner* — Daphne M Barry
(74) *Attorney, Agent, or Firm* — James E. Walton

(57) ABSTRACT

The present application relates to a valve for a cryogenic gas. The valve includes a body with a main inlet, a main outlet, and a main passage. The valve also includes a main shutter for the main passage, the main shutter including an auxiliary inlet, an auxiliary outlet, and an auxiliary passage, in which an auxiliary shutter is arranged, which includes a closing surface configured to close the auxiliary outlet and be able to drive the main shutter in the closing direction, and a drive surface configured to drive the main shutter in the opening direction, while resting on the edge of the auxiliary inlet and blocking the auxiliary inlet partially in order to brake the flow there. The drive surface is formed by drive lugs which are connected to a head of the auxiliary shutter. The lugs form a bayonet coupling between the shutters. The present application also relates to an electrovalve.

19 Claims, 4 Drawing Sheets

(56) References Cited

U.S. PATENT DOCUMENTS 6,390,441 B2 * 5/2002 Koyama ............... F16K 31/408
 251/30.03

* cited by examiner

AEROSPACE ELECTROVALVE FOR HIGH-PRESSURE CRYOGENIC GAS

This application claims priority under 35 U.S.C. § 119 to European Patent Application No. 14161166.5, filed 21 Mar. 2014, titled "Aerospace Electrovalve for High-Pressure Cryogenic Gas," which is incorporated herein by reference for all purposes.

BACKGROUND

1. Field of the Application

The present application relates to a gas valve with an auxiliary shutter inside a main shutter. The present application also concerns an electrovalve with a solenoid, the plunger of which is immersed in the fluid.

2. Description of Related Art

In order to control the distribution of a fluid, the distribution circuits are equipped with electrovalves. An electrovalve is generally fitted with an actuator, for example a solenoid which drives a shutter of a valve between a closed position and an open position. As a safety measure, the electrovalve may be configured such that the pressure of the fluid holds it closed. In this case, the pressure exerts a closing force against the shutter which is proportional to said pressure. In response, the electrovalve must be dimensioned so as to counterbalance the closing force.

In the context of a high-pressure application, the solenoid must be massive and heavy in order to provide a sufficient opening force. This effect on the mass then becomes critical on installation in an aircraft. There is therefore a need to reduce the closing force. A known solution consists of splitting the shutter into a main shutter and an auxiliary shutter which opens and closes an orifice in the main shutter. This orifice is configured so as to create a pressure balance on either side of the main shutter in order to facilitate its actuation. The opening force is reduced since the pressure difference applies only to the auxiliary shutter, and hence essentially the dimensions are reduced.

Document U.S. Pat. No. 4,928,733 A discloses a valve with a main body, a main shutter and an auxiliary shutter. The main shutter comprises a lower bore which the auxiliary shutter may close. The latter is also able to drive the main shutter in the opening and closing directions. Closure and drive during closure are carried out by means of an auxiliary shutter head. The valve comprises a guide to accompany the main shutter, in addition to the auxiliary shutter rod on which it slides. On opening of the auxiliary shutter, a leakage flow takes place between the main shutter and its guide. Then the pressure balance around the auxiliary shutter is achieved using axial channels produced in the mass of the main shutter.

This valve allows a reduction in the opening force. Its architecture however is difficult to produce. It has complex shapes and a portion arranged in a cavity with poor access. Also the opening is not progressive. In the context of an application for high-pressure gas, the opening movement of the auxiliary shutter generates a pressure peak which can damage associated equipment.

Although great strides have been made in the area of gas valves, many shortcomings remain.

DETAILED DESCRIPTION OF THE PREFERRED EMBODIMENT

Figure 1:
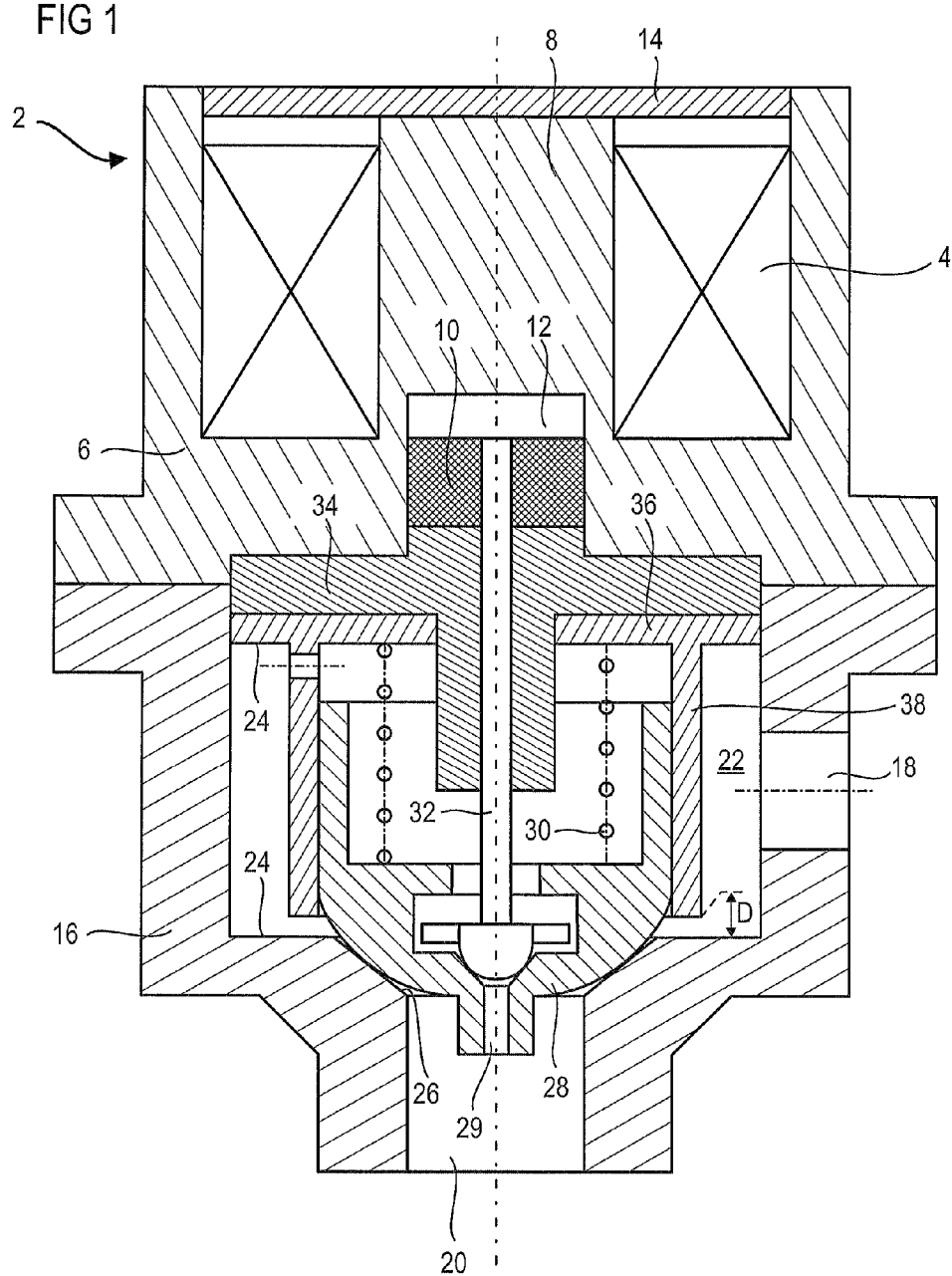
FIG. 1 shows the valve in the closed position according to the present application.

The present application aims to resolve at least one of the technical problems raised by the prior art. More precisely, the object of the present application is to make the opening movement of a valve with a main shutter and an auxiliary shutter more progressive. The object of the present application is also to slow down the start of the opening of a valve with a main shutter and an auxiliary shutter.

The present application discloses a valve, in particular for a cryogenic gas, the valve comprising a body with a main inlet, a main outlet and a main passage which connects the main inlet to the main outlet; a main shutter for the main passage, the main shutter comprising an auxiliary inlet, an auxiliary outlet in communication with the main outlet, and an auxiliary passage which connects the auxiliary inlet to the auxiliary outlet; an auxiliary shutter comprising a closing surface configured to shut off the auxiliary passage and to drive the main shutter in the closing direction, which valve is distinguished in that the auxiliary shutter also comprises a drive surface configured to drive the main shutter in the opening direction while resting on the edge of the auxiliary inlet and blocking it partially in order to brake the flow there.

According to an advantageous embodiment of the present application, the auxiliary shutter comprises at least one drive lug protruding transversely relative to the direction of movement of the auxiliary shutter, the drive surface being arranged on the at least one drive lug.

According to an advantageous embodiment of the present application, the edge of the auxiliary inlet of the main shutter comprises at least one notch, the contour of which corresponds to that of the at least one drive lug so as to allow insertion of each drive lug inside the auxiliary passage, the drive lug being offset angularly relative to the notch.

According to an advantageous embodiment of the present application, the auxiliary shutter comprises several drive lugs angularly distributed around the auxiliary shutter, each with a portion of the drive surface, preferably the main shutter comprises notches associated with the drive lugs so as to form a bayonet coupling.

According to an advantageous embodiment of the present application, the auxiliary shutter comprises a control rod passing through the auxiliary inlet, and a head on which the closing surface is formed, the drive surface being linked to the control rod via the head.

According to an advantageous embodiment of the present application, the head extends over the majority of the passage section of the auxiliary inlet, and/or the head occupies the majority of the volume of the auxiliary passage.

According to an advantageous embodiment of the present application, the contour of the head follows the contour of the auxiliary inlet, the head being configured such that when the drive surface is in contact with the main shutter, the head is axially level with the auxiliary inlet so as to create a load loss there.

According to an advantageous embodiment of the present application, the auxiliary passage generally takes the form of a disc, the auxiliary shutter occupying the majority of the disc volume.

According to an advantageous embodiment of the present application, the auxiliary inlet has a space which surrounds the auxiliary shutter, the edge of the auxiliary inlet forming an annular contraction at the auxiliary passage.

According to an advantageous embodiment of the present application, the auxiliary shutter comprises a drive portion, the closing surface and the drive surface being arranged on axially opposing faces of the drive portion which are oriented in opposite directions to said surfaces.

According to an advantageous embodiment of the present application, the valve comprises a main guide to guide the main shutter by means of a guide partition on which the main shutter slides, the majority of the main shutter being encased in the guide partition in the closed position, the contact between the main shutter and the main guide generally being sealed, preferably the sealed contact is configured to allow a fluid flow above a pressure greater than 50 bar, more preferably greater than 100 bar.

According to an advantageous embodiment of the present application, the guide partition comprises an orifice arranged remotely from the main shutter when the latter is in the closed position, preferably the orifice is closed when the main shutter is in the open position.

According to an advantageous embodiment of the present application, the main passage comprises two opposing walls in the direction of movement of the main shutter, the guide partition extends from one wall towards the other wall up to a distance D from the other wall, the distance D being less than the travel of the main shutter and/or the auxiliary shutter between the open position and the closed position, preferably in the open position the main shutter and the main guide define a generally enclosed area.

According to an advantageous embodiment of the present application, the main passage comprises a main chamber in which the main shutter is housed, the main shutter being mobile in translation from one end of the main chamber to the other.

According to an advantageous embodiment of the present application, the closing surface and/or the drive surface are integral and/or are smooth.

According to an advantageous embodiment of the present application, the valve is a high-pressure valve.

According to an advantageous embodiment of the present application, the auxiliary outlet communicates, where applicable directly, with the main outlet.

According to an advantageous embodiment of the present application, the auxiliary outlet is a channel passing through the main shutter.

According to an advantageous embodiment of the present application, each drive lug is arranged inside the auxiliary passage.

According to an advantageous embodiment of the present application, the head has a width greater than the control rod and a size smaller than the auxiliary inlet.

According to an advantageous embodiment of the present application, the head extends over the axial majority of the auxiliary passage.

According to an advantageous embodiment of the present application, the auxiliary passage is arranged in the downstream portion of the main shutter. The downstream portion is the portion on the side of the auxiliary outlet.

According to an advantageous embodiment of the present application, the auxiliary outlet forms an axial end of the main shutter.

According to an advantageous embodiment of the present application, each guide extends axially over the majority of the associated shutter.

According to an advantageous embodiment of the present application, the main shutter and the auxiliary shutter are made of the same material.

According to an advantageous embodiment of the present application, the valve is configured such that the closing direction of the auxiliary shutter corresponds to the closing direction of the main shutter.

According to an advantageous embodiment of the present application, the main shutter is arranged between the opposing walls of the main passage.

The present application also concerns an electrovalve comprising a valve for gas, distinguished in that the valve is in accordance with the present application, the electrovalve comprises an electromagnetic actuator with at least one solenoid, a magnetic circuit for channelling the magnetic flux of the solenoid, the circuit comprising a ferromagnetic hub and a ferromagnetic plunger to which the auxiliary shutter is connected, the electrovalve being configured such that in the closed state, the pressure difference between the main inlet and the main outlet exerts a closing force on the plunger which holds the electrovalve closed by means of the main shutter and the auxiliary shutter.

The present application allows control of the valve opening. This opening takes place in two stages, the first stage being performed while controlling the auxiliary flow through the main shutter thanks to the drive surface. This acts as a mask which regulates the flow of the auxiliary inlet.

The cavity delimited by the main shutter and its guide forms a fluid reservoir used to brake the opening of the main shutter. In fact in this movement, the fluid is braked thanks to lugs which obstruct the flow via the auxiliary inlet.

In the description which follows, the axial direction may correspond to a rotation axis of a shutter, or to a translation direction of closure of a shutter. The transverse or radial direction is perpendicular to the axial direction.

FIG. 1 shows a valve according to the present application which is here shown in the closed position. It may be a monostable or bistable valve. It may be used in the aerospace sector and can resist vibrations of at least 20 g.

The valve 2 may be an electrovalve. The valve 2 may comprise a solenoid actuator or any other equivalent actuator. It may comprise a magnetic circuit with a coil 4 and a casing 6 which conducts the flow around the windings of the coil 4. Coil 4 may be duplicated to increase reliability and/or make the valve bistable. The casing 6 may comprise a hub 8 arranged inside the coil 4. Alternatively the hub 8 may be discretely arranged in the casing 6.

The valve 2 may also comprise a movable plunger 10 which may be arranged inside the casing 6. The plunger 10 and the hub 8 define an air gap 12 which is open when the coil 4 is not powered, and which closes—where applicable in steps—when the actuator is powered. The valve 2 may also comprise a permanent magnet or a spring (not shown) to hold the plunger 10 in the desired position, such as the closed position. A cover 14 may be used to enclose each coil 4 in a sealed fashion in the casing 6. It is understood that the casing, its hub and the plunger may be made of a ferromagnetic material.

The valve 2 also comprises a body 16 which may be a cover, where applicable fixed to the casing. The body 16 comprises a main inlet 18 which may be oriented radially, a main outlet 20 which may be oriented axially, and a main passage 22 for connecting the main inlet 18 to the main outlet 20. The main inlet 18 is connected to a fluid source, for example a high-pressure gas, where applicable cryogenic. The term "high-pressure" means a pressure greater than 50 bar, preferably greater than 100 bar, more preferably greater than 400 bar. The main passage 22 may have a main chamber, where applicable cylindrical in form. The main chamber may comprise two axially opposed walls 24, one of which surrounds the main seat 26 and the other being on the actuator side. The main chamber may be cylindrical.

The valve 2 also comprises a main shutter 28 to shut off the circulation of fluid in the main passage 22. The main shutter 28 cooperates with the main seat 26 formed in the body 16 inside the main passage 22 on the side of the main outlet 20. The main shutter 28 may be mobile in translation. It has a generally cylindrical form, in some cases hollow. It comprises an auxiliary inlet, an auxiliary outlet 29 and an auxiliary passage for connecting the auxiliary inlet to the auxiliary outlet. The outlets 20 and 29 may be in communication, possibly directly. The valve 2 may comprise a spring 30 to hold the main shutter in the closed position. The auxiliary passage may have a flat shape such as a general disc shape. Its axial height may be less than or equal to the transverse width.

The valve 2 comprises an auxiliary shutter 32 to shut off the auxiliary passage. It is actuated by the actuator. One of its ends may be fixed to the plunger 10. The auxiliary shutter 32 may occupy the majority of the volume of the auxiliary passage, preferably the majority of the volume of the disc of the chamber. The valve 2 may comprise an auxiliary guide 34 for the auxiliary shutter 32. This guide 34 may comprise a guide bearing in which a control rod of the auxiliary shutter slides. The fluid may penetrate between the rod and the guide bearing as far as the air gap, such that the fluid pressure at the main inlet 18 exerts an axial thrust on the rod towards the closed position. The auxiliary guide 34 may form a stop for the plunger 10.

The valve 2 may comprise a main guide 36 for the main shutter. This main guide 36 may have a partition 38, possibly in tubular form, the inner surface of which is in contact with the outer surface of the main shutter 28. The main guide 36 may extend over the axial majority of the main shutter 28, both in the closed position and in the open position. The partition 38 may extend axially over the majority of the main chamber. It may extend from one wall 24 towards the other wall 24 of the main chamber up to a distance D from the other wall 24. The main guide 36 is radially spaced from the side walls of the main passage 22. The guides 34, 36 may be in contact with each other. The shutters 28, 32 and the guides 34, 36, where applicable the main guide associated with the main shutter, may define an essentially closed cavity.

The circulation of the fluid may exert a dynamic pressure which applies an opening force on the main shutter 28, allowing this to open further than permitted by the auxiliary shutter 32 alone. The shutters are each mobile between at least an open position remote from the corresponding seat 26, and a closed position in contact with the corresponding seat 26. The travel of the main shutter 28 may be greater than the travel of the auxiliary shutter 32. The distance D may be less than the travel of the main shutter 28 and/or the auxiliary shutter 32 between the open position and the closed position.

Figure 2:
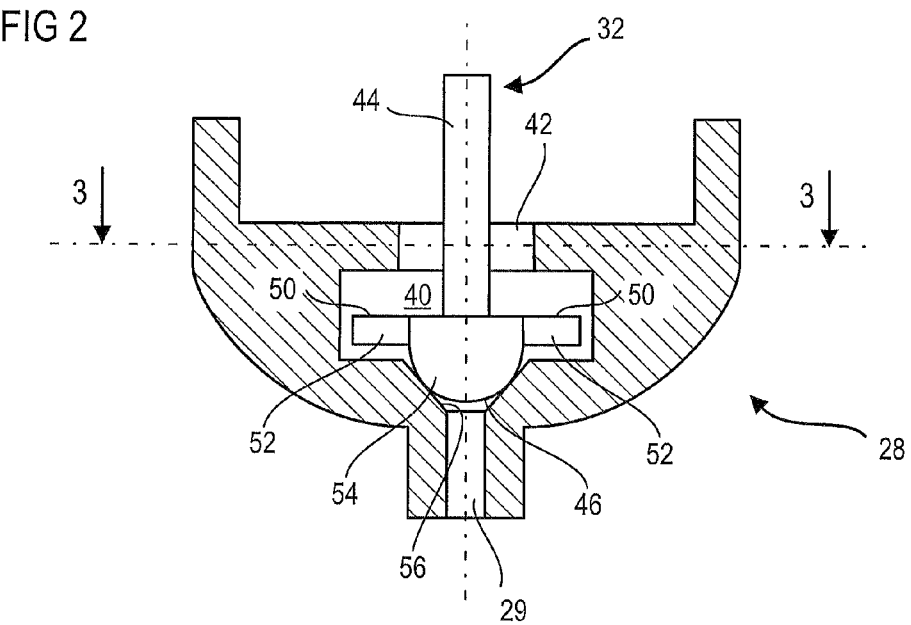
FIG. 2 depicts an enlarged view of the shutters, the auxiliary shutter being in the closed position according to the present application.

FIG. 2 shows an enlarged view of the shutters, the auxiliary shutter 32 being shown in the closed position relative to the main shutter 28.

The auxiliary shutter 32 is arranged in the main shutter 28 so as to occupy the auxiliary passage 40; with its control rod 44, it may pass through the auxiliary inlet 42 and in some cases through the main passage. Because of its shape it allows regulation of the flow in the auxiliary passage 40. The auxiliary shutter 28 is mobile, for example in translation. It may also sweep through its positions following a rotation, as could the main shutter.

The auxiliary shutter 32 comprises a closing surface 46 for the auxiliary passage 40. When the closing surface 46 is in contact with the auxiliary seat 48 of the main shutter 28, it can both shut off the circulation and hold the main shutter 28 in the closed position. It may also drive the main shutter 28 in the closing direction. The auxiliary shutter 32 assumes the function of an actuator for the main shutter. The actuating rod 44 mechanically connects the plunger to the closing surface 46.

The auxiliary shutter 28 also comprises at least one drive surface 50 for driving the main shutter 28 in the opening direction. For this, the drive surface 50 rests against the main shutter 28 at the level of the auxiliary inlet 42, blocking it partially. It may intersect the edge of the auxiliary inlet 42. Thus the drive surface 50 locally blocks the auxiliary inlet 42 and limits the flow. The drive surface 50 may divide the flow into the auxiliary inlet 42, for example by being in contact with its edge.

The drive surface 50 and the closing surface 46 may be combined on a same drive portion of the main shutter 28. This drive portion may be housed in the auxiliary passage 40. The drive surface 50 and the closing surface 46 are arranged on axially opposing faces of the drive portion; they may be offset axially and each face in an opposite direction to the other of the two surfaces.

The auxiliary shutter 28 may comprise at least one drive lug 52, for example two or more. The drive lugs 52 may be distributed angularly over the periphery of the auxiliary shutter 28. The drive surface 50 may be arranged on the drive lug 52 or may be divided over the plurality of drive lugs 52, where applicable to create a balanced and/or distributed drive. Each drive lug 52 extends transversely relative to the direction of movement of the auxiliary shutter 32.

The auxiliary shutter 32 may comprise a head 54 on which the closing surface 46 is formed. The closing surface 46 may cooperate with the auxiliary seat 56 formed on the main shutter 28, in order to shut off the circulation in the auxiliary passage 40. The head 54 may occupy the majority of the inner volume of the auxiliary passage 40. It forms both a plug and an element for regulating flow by load loss. It may accentuate the choking between the rod 44 and the edge of the auxiliary inlet 42. Its contour generally corresponds to that of the main inlet, while however being of smaller size so that it can be inserted therein. Its contour may be locally larger and be force-mounted. The drive lugs 52 may be connected to and/or formed with the head 54. The drive lugs 52 and the head 54 may have a common plane, one portion of which forms the drive surface 50.

Figure 3:
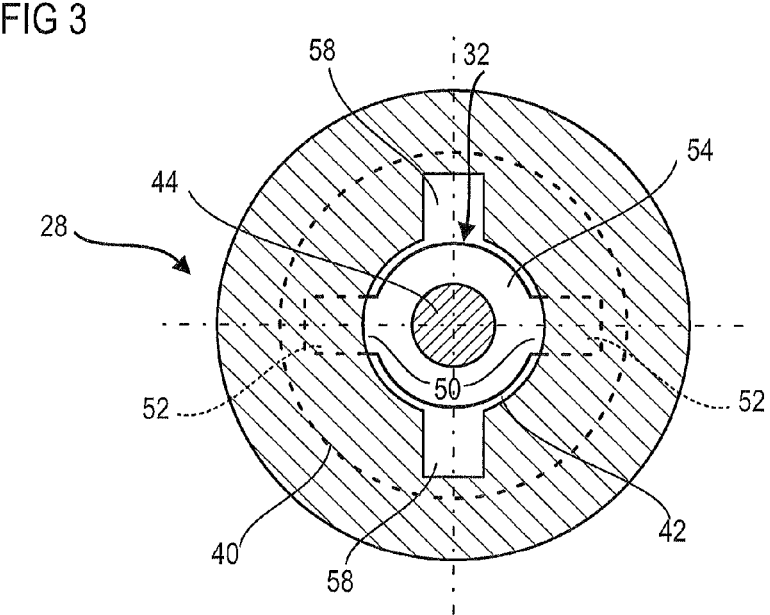
FIG. 3 illustrates a section of the shutters along axis 3-3 drawn on FIG. 2, according to the present application.

FIG. 3 shows a section of the shutters along axis 3-3 drawn on FIG. 2.

The contour of the auxiliary inlet 42 of the main shutter 28 has at least one notch 58, preferably several notches 58, the shape of which generally follows that of the drive surface 50 or those of portions of drive surfaces. In the case where each drive surface 50 is carried by one or more drive lugs 52, the contour of the or each notch 58 corresponds to that of each drive lug 52 while being substantially larger. This architecture allows a bayonet-type mounting of the shutters. The auxiliary shutter 32 is axially introduced in the main shutter 28 then pivoted through a fraction of a turn to allow axial retention. The disc form of the auxiliary passage 40 is advantageous since it allows rotation of the auxiliary shutter 32. Means for blocking the shutters in rotation may be provided in the valve.

Figure 4:
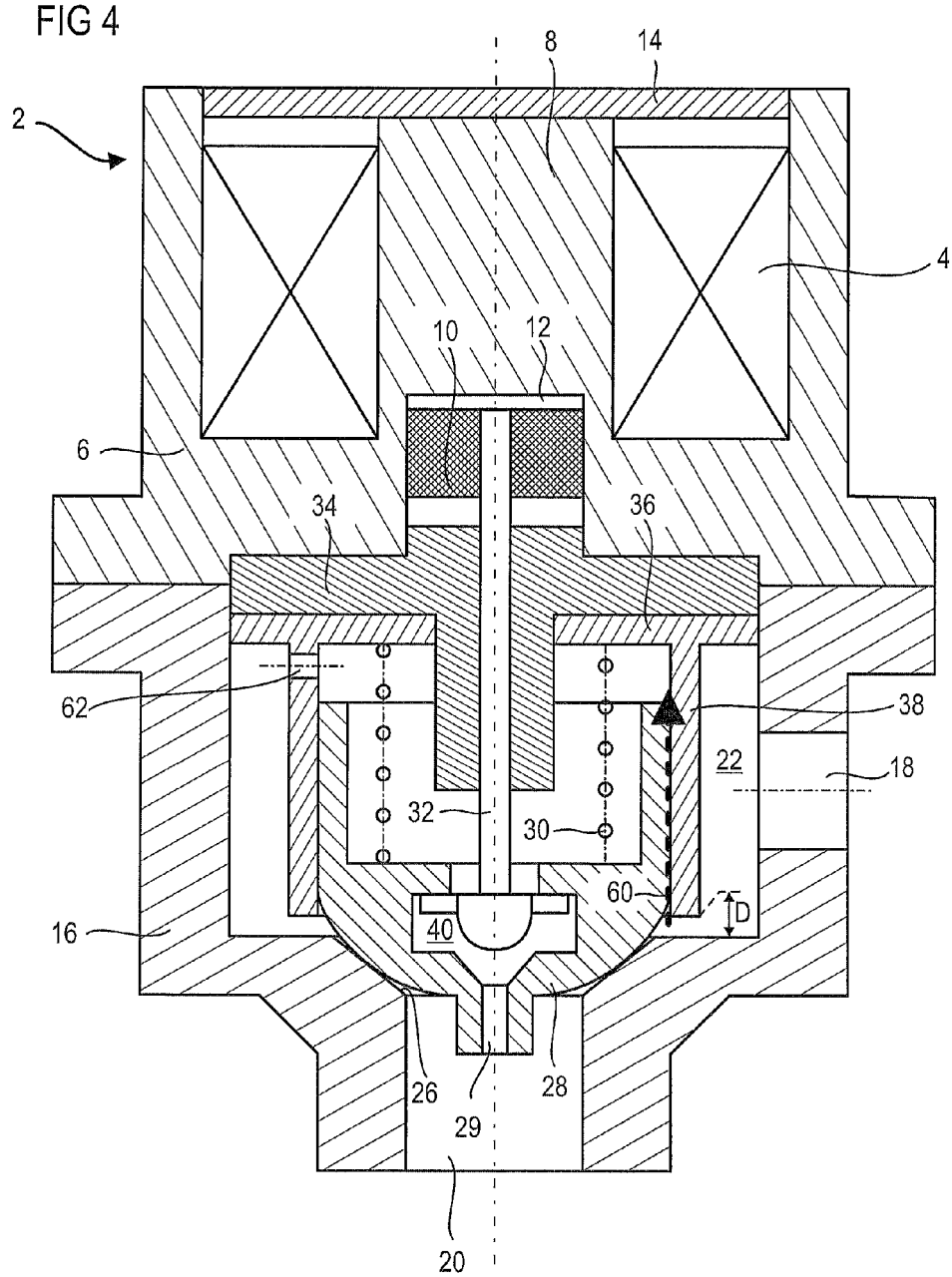
FIG. 4 depicts the valve in an intermediate position where the main shutter is in the closed position and the auxiliary shutter is in the open position according to the present application.

FIG. 4 shows an intermediate step in the opening of the valve. The main shutter remains in its closed position while the auxiliary shutter has left its seat and is in the open position.

In the intermediate step, the plunger 10 moves away from the auxiliary guide 34 and is drawn towards the hub 8. The air gap 12 closes partially but remains open. A reduced initial flow passes through the auxiliary passage 40.

During this intermediate step, the auxiliary shutter 32 moves until it comes to rest against a face of the auxiliary passage 40 opposite the auxiliary seat. It has opened the auxiliary passage 40 so as to allow communication into the auxiliary passage. This opening can allow a pressure reduction in the main shutter 28.

The contact between the main guide 36 and the main shutter 28 may be a generally sealed contact. This contact may remain sealed until reaching a threshold pressure, for example at least 50 bar, preferably at least 100 bar, more preferably at least 200 bar, in some cases at least 400 bar. This seal may be weaker than that between the main shutter 28 and the main seat 26. Therefore when the valve 2 is in the intermediate position and the pressure difference between the main inlet 18 and the main outlet 20 is greater than the threshold pressure, an auxiliary leak 60 may appear at the interface. This helps balance the pressures on either side of the main shutter 28 so as to reduce the actuating force in the opening direction from the closed position.

In addition or alternatively, the partition of the main guide may have an orifice 62 which may allow communication between the outside of the partition 38 and the inside of the hollow form of the main shutter. When the auxiliary shutter 32 is open, the pressures on either side of the main shutter 40 are balanced, which facilitates its actuation.

Figure 5:
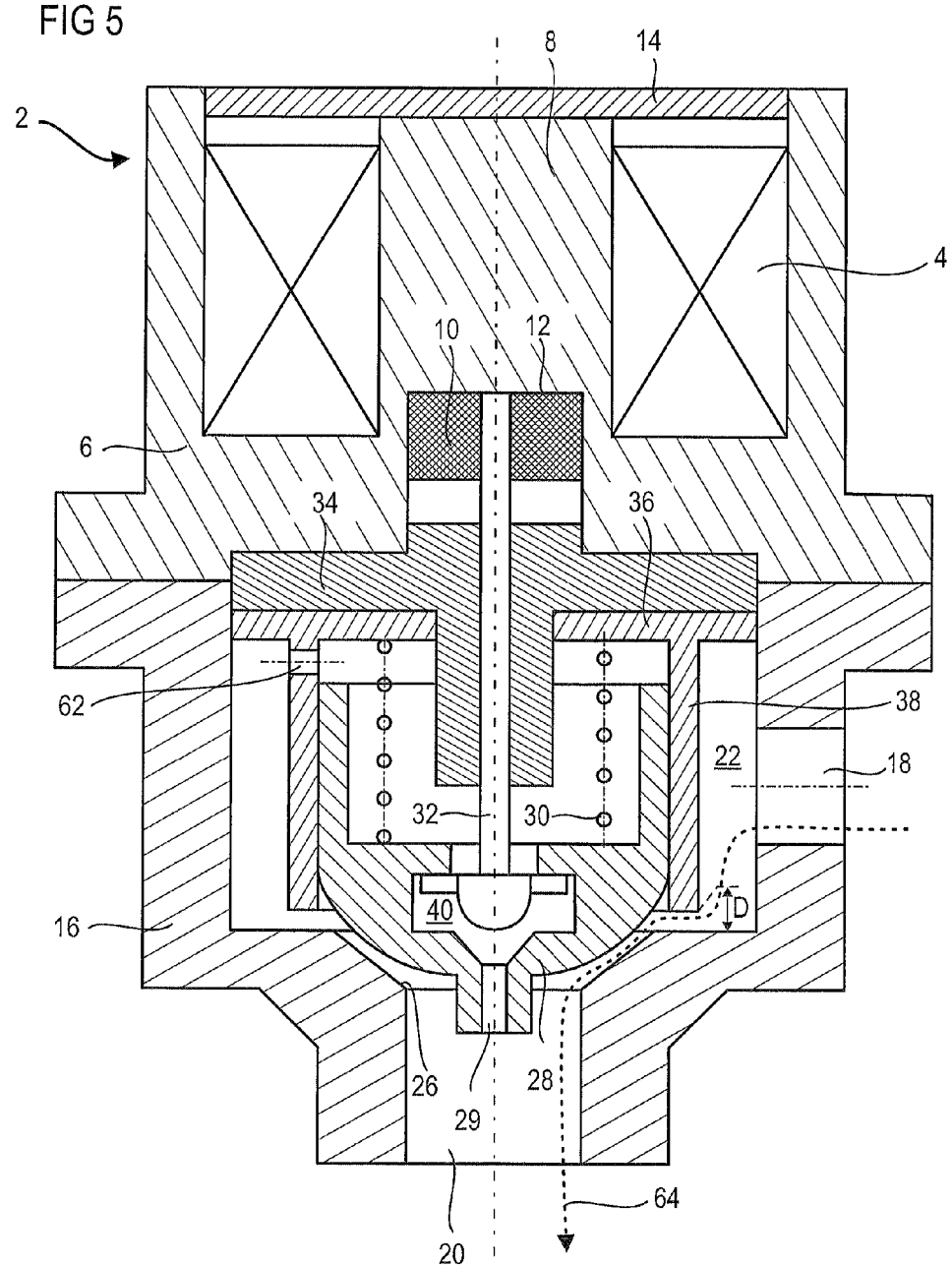
FIG. 5 shows the valve in a position in which both shutters are in the open position according to the present application.

FIG. 5 shows the open state of the valve, the main shutter and the auxiliary shutter both being in the open position relative to their respective seats.

In this state, the plunger 10 comes into contact with the hub 8. The air gap 12 is closed under the magnetic force. The spring 30 may hold the main shutter 28 and the drive surface in contact.

The auxiliary shutter 32 has finished its travel, causing the main shutter 28 to move away from its main seat 26. Thus the main passage 22 is open and allows a main circulation 64.

In an alternative embodiment of the present application, the dynamic pressure of the main circulation may exert a force on the main shutter so as to open it further. This pressure may move the main shutter away from the drive surface, where applicable the main shutter may continue its opening movement until it comes into contact with the closing surface of the auxiliary shutter and/or one of the faces of the wall of the main passage.

We claim:

1. A valve for a cryogenic gas, comprising:
   a body having a main inlet, a main outlet, and a main passage which connects the main inlet to the main outlet;
   a main shutter for the main passage, the main shutter comprising:
   an auxiliary inlet;
   an auxiliary outlet in communication with the main outlet; and
   an auxiliary passage which connects the auxiliary inlet to the auxiliary outlet; and
   an auxiliary shutter comprising:
   a closing surface configured to shut off the auxiliary passage and to drive the main shutter in the closing direction; and
   a drive surface configured to drive the main shutter in the opening direction while resting on the edge of the auxiliary inlet and blocking the auxiliary inlet partially in order to brake the flow there,
   the auxiliary inlet has a space which surrounds the auxiliary shutter, the edge of the auxiliary inlet forming an annular contraction at the auxiliary passage.

2. The valve according to claim 1, wherein the auxiliary shutter comprises: at least one drive lug protruding transversely relative to the direction of movement of the auxiliary shutter, the drive surface being arranged on the at least one drive lug.

3. The valve according to claim 2, wherein the edge of the auxiliary inlet of the main shutter comprises:
   at least one notch, the contour of which corresponds to that of the at least one drive lug, so as to allow insertion of each drive lug inside the auxiliary passage, the drive lug being offset angularly relative to the notch.

4. The valve according to claim 2, wherein the auxiliary shutter comprises:
   several drive lugs angularly distributed around the auxiliary shutter, each with a portion of the drive surface, the main shutter comprising:
   notches associated with the drive lugs so as to form a bayonet coupling.

5. The valve according to claim 1, wherein the auxiliary shutter comprises:
   a control rod passing through the auxiliary inlet; and
   a head on which the closing surface is formed, the drive surface being linked to the control rod via the head.

6. The valve according to claim 5, wherein the head extends over at least the half of the passage section of the auxiliary inlet, and/or the head occupies at least the half of the volume of the auxiliary passage.

7. The valve according to claim 5, wherein the head is configured such that when the drive surface is in contact with the main shutter, the head is axially level with the auxiliary inlet so as to create a load loss there.

8. The valve according to claim 1, wherein the auxiliary passage generally takes the form of a disc, the auxiliary shutter occupying at least the half of the disc volume.

9. The valve according to claim 1, wherein the auxiliary shutter comprises:
   a drive portion, the closing surface and the drive surface being arranged on axially opposing faces of the drive portion which are oriented in opposite directions to said surfaces.

10. The valve according to claim 1, further comprising:
    a main guide to guide the main shutter by means of a guide partition on which the main shutter slides, at least the half of the main shutter being encased in the guide partition in the closed position, the contact between the main shutter and the main guide being sealed, the sealed contact being configured to allow a fluid flow above a pressure greater than 50 bar.

11. The valve according to claim 10, wherein the guide partition comprises:

an orifice arranged remotely from the main shutter when the latter is in the closed position, the orifice being closed when the main shutter is in the open position.

12. The valve according to claim 1, further comprising:
a main guide to guide the main shutter by means of a guide partition on which the main shutter slides, at least the half of the main shutter being encased in the guide partition in the closed position, the contact between the main shutter and the main guide being sealed, the sealed contact being configured to allow a fluid flow above a pressure greater than 100 bar.

13. The valve according to claim 1, wherein the main passage comprises:
two opposing walls in the direction of movement of the main shutter, the guide partition extending from one wall towards the other wall up to a distance D from the other wall, the distance D being less than the travel of the main shutter and/or the auxiliary shutter between the open position and the closed position, in the open position the main shutter and the main guide defining a enclosed area.

14. The valve according to claim 1, wherein the main passage comprises:
a main chamber in which the main shutter is housed, said main chamber comprising a first end and a second end opposed to the first end, the main shutter being mobile in translation from the first end one end of the main chamber to the second end.

15. A valve for a cryogenic gas, comprising:
a body having a main inlet, a main outlet, and a main passage which connects the main inlet to the main outlet;
a main shutter for the main passage, the main shutter comprising:
an auxiliary inlet;
an auxiliary outlet in communication with the main outlet; and
an auxiliary passage which connects the auxiliary inlet to the auxiliary outlet; and
an auxiliary shutter comprising:
a closing surface configured to shut off the auxiliary passage and to drive the main shutter in the closing direction; and
a drive surface configured to drive the main shutter in the opening direction while resting on the edge of the auxiliary inlet and blocking the auxiliary inlet partially in order to brake the flow there,
wherein the auxiliary shutter comprises: at least one drive lug protruding transversely relative to the direction of movement of the auxiliary shutter, the drive surface being arranged on the at least one drive lug,
wherein the edge of the auxiliary inlet of the main shutter comprises:
at least one notch, the contour of which corresponds to that of the at least one drive lug, so as to allow insertion of each drive lug inside the auxiliary passage, the drive lug being offset angularly relative to the notch.

16. The valve according to claim 15, wherein the auxiliary inlet has a space which surrounds the auxiliary shutter, the edge of the auxiliary inlet forming an annular contraction at the auxiliary passage.

17. The valve according to claim 15, wherein the auxiliary shutter comprises:
several drive lugs angularly distributed around the auxiliary shutter, each with a portion of the drive surface, the main shutter comprising:
notches associated with the drive lugs so as to form a bayonet coupling.

18. A valve for a cryogenic gas, comprising:
a body having a main inlet, a main outlet, and a main passage which connects the main inlet to the main outlet;
a main shutter for the main passage, the main shutter comprising:
an auxiliary inlet;
an auxiliary outlet in communication with the main outlet; and
an auxiliary passage which connects the auxiliary inlet to the auxiliary outlet; and
an auxiliary shutter comprising:
a closing surface configured to shut off the auxiliary passage and to drive the main shutter in the closing direction; and
a drive surface configured to drive the main shutter in the opening direction while resting on the edge of the auxiliary inlet and blocking the auxiliary inlet partially in order to brake the flow there,
the valve further comprising a main guide to guide the main shutter by means of a guide partition on which the main shutter slides, the guide partition comprising an orifice arranged remotely from the main shutter when the latter is in the closed position, the orifice being open when the main shutter is in the closed position, wherein the auxiliary inlet has a space which surrounds the auxiliary shutter, the edge of the auxiliary inlet forming an annular contraction at the auxiliary passage.

19. The valve according to claim 18, wherein the auxiliary shutter comprises:
at least one drive lug protruding transversely relative to the direction of movement of the auxiliary shutter, the drive surface being arranged on the at least one drive lug, and wherein the edge of the auxiliary inlet of the main shutter comprises:
at least one notch, the contour of which corresponds to that of the at least one drive lug, so as to allow insertion of each drive lug inside the auxiliary passage, the drive lug being offset angularly relative to the notch.

* * * * *